United States Patent Office  
2,999,867  
Patented Sept. 12, 1961

2,999,867  
EPOXIDES AND METHOD OF MAKING THE SAME  
Paul S. Starcher, Charleston, and Samuel W. Tinsley, South Charleston, W. Va., assignors to Union Carbide Corporation, a corporation of New York  
No Drawing. Filed Dec. 31, 1957, Ser. No. 706,305  
4 Claims. (Cl. 260—348)

The present invention relates to a novel series of synthetic organic chemical compounds and has for an object the provision of new types of epoxides particularly adaptable for use as plasticizers and stabilizers for the halogen-containing vinyl-type resins. More particularly, the present invention is directed to certain epoxides of 3-cyclohexene-1,1-dimethanol esters of acids and mixtures of acids comprising linoleic and linolenic acids.

The 3,4-epoxycyclohexane-1,1-dimethanol bis(di- and triepoxyalkanoates) of this invention can be represented by the general formula:

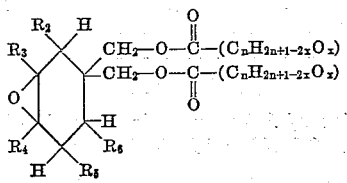

wherein $R_2$ through $R_6$ represent hydrogen atoms or lower alkyl groups and each of the groups $(C_nH_{2n+1-2x}O_x)$ separately represent an epoxyalkyl group containing $n$ carbon atoms, $2n+1-2x$ hydrogen atoms and $x$ oxygen atoms and wherein $n$ represents the integer 17 and $x$ represents a whole positive integer in the range of from 2 through 3. As used herein, the term "lower alkyl" is intended to include saturated aliphatic hydrocarbon radicals containing from one through eight carbon atoms such as methyl, ethyl, propyl, isopropyl, n-butyl, sec-butyl, tertiary-butyl, amyl, hexyl, heptyl, 2-ethylhexyl and octyl groups.

A preferred class of compounds to which this invention is directed are compounds represented by the structural formula set forth above wherein $R_2$ through $R_6$ represent hydrogen or lower alkyl groups with the further provision that when any of $R_2$ through $R_6$ represent lower alkyl groups the total number of carbon atoms in said alkyl groups does not exceed twelve.

A particularly preferred subclass of compounds within the scope of this invention are those compounds represented by the structural formula set forth above wherein $R_2$ and $R_6$ represent methyl groups.

The compounds of this invention are useful in the preparation of synthetic condensation polymers. One of the most interesting characteristics of the compounds of this invention is the difference in reactivity of the various oxirane rings of the aforementioned epoxides. For example, the epoxide group attached to the cyclohexyl ring is more easily attacked by acidic reagents and active hydrogen compounds such as phenols, alcohols, carboxylic acids and the like than are the epoxide groups attached to the fatty acid portions of the molecule. Thus, selective reaction of the cyclohexyl epoxide group can be induced while the other epoxide groups of the fatty acid portions of the molecule are left unattacked. By virtue of this selective reactivity of the oxirane ring of the compounds of this invention, they are eminently suitable for use in making soluble, fusible resins capable of being thermoset to provide products useful in casting, coatings and laminates.

The compounds of this invention are prepared by the reaction of peracetic acid or acetaldehyde monoperacetate and a trienoic acid ester of 3-cyclohexene-1,1-dimethanol as illustrated by the following general equation, in the case of 3-cyclohexene-1,1-dimethanol dilinolenate.

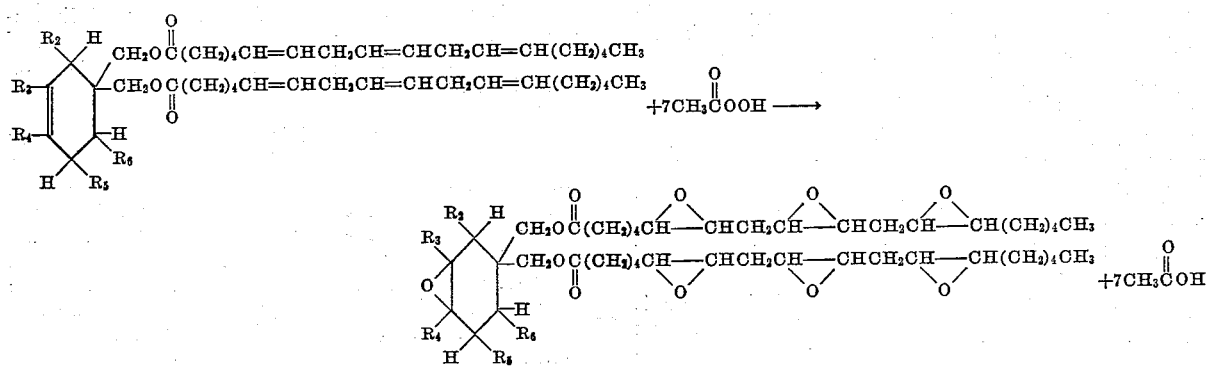

The process of producing the compounds of this invention is carried out at temperatures in the range of from —25° C. to 150° C. At lower temperatures, the rate of epoxidation is slow. At higher temperatures, the rate of epoxidation is faster, but precautions are necessary to prevent the further reaction of the epoxide groups. Temperatures in the range of from 10° C. to 90° C. are preferably used to provide a suitable reaction rate and to avoid undesired side reactions. The olefinically unsaturated starting material is conveniently charged to a reaction vessel and the theoretical quantity of peracetic acid is then added. Seven or more mols of peracetic acid per mol of olefinically unsaturated compound are usually added to the olefinically unsaturated starting material. Both types of double bonds in the molecule are relatively easily attacked by the peracetic acid and the epoxidation of both types appears to proceed simultaneously. The reaction is allowed to proceed until approximately the theoretical amount of peracetic acid is consumed, which is determined by periodic tests for peracetic acid. The time of reaction is usually from about one to ten hours, depending on the temperature. In working up the crude reaction product, it is preferred, although not absolutely necessary, to separate the by-product acetic acid from the epoxide rapidly, since the by-product acetic acid will react with the epoxide to form undesired products thus decreasing the overall yield of triepoxide product. The reaction mixture is then subjected to conventional recovery procedures for the recovery of the epoxide product. The product can be recovered by extraction with a suitable solvent; continuous distillation or distillation under reduced pressures as desired, or a residue product may be taken.

The 3-cyclohexene-1,1-dimethanols are obtained by the reaction of the corresponding 3-cyclohexenecarboxaldehyde (prepared by the Diels-Alder reaction of butadiene or a substituted butadiene with acrolein, crotonaldehyde, and the like) with excess formaldehyde in the presence of a base catalyst such as KOH as described by H. E.

French and D. M. Gallagher in J.A.C.S., 64, 1497 (1942).
A variety of cycloaliphatic aldehydes suitable for reaction with formaldehyde to form the corresponding 3-cyclohexene-1,1-dimethanols can be produced having alkyl substituents contained in the ring when compounds such as acrolein and crotonaldehyde are reacted with dienes such as butadiene, piperylene, isoprene, 2,3-dimethyl-1,3-pentadiene and the like.

The preferred 3-cyclohexene-1,1-dimethanols which contain alkyl groups attached to the cyclohexenyl ring are those with alkyl substitutents having from one to four carbon atoms in the alkyl chain such as, for example, methyl, ethyl, propyl, isopropyl, butyl, isobutyl, tertiary butyl groups, and the like.

Particularly preferred 3-cyclohexene-1,1-dimethanols to be used in producing the novel epoxy esters of this invention are 3-cyclohexene-1,1-dimethanol and the methyl substituted 3-cyclohexene-1,1-dimethanols which include representative compounds such as 6-methyl-3-cyclohexene-1,1-dimethanol.

The fatty acids can be derived from any animal, vegetable or marine oil containing linolenic acid. The fatty acid group can be the mixed fatty acids in such oils. Typical oils which can be employed include cottonseed oil, linseed oil, perilla oil, rapeseed oil, safflower oil, and soybean oil. If desired, the linolenic or linoleic can be isolated in the pure state although that is not necessary. In fact it is sometimes desirable to employ the mixed fatty acids directly because of ease of handling and cost.

The fatty acid or mixture of fatty acids are esterified in a conventional manner with an appropriate 3-cyclohexene-1,1-dimethanol to provide the starting material for expoxidation as aforesaid.

Thus an important embodiment of this invention is directed to mixtures comprising the dihydroxy diesters of alcohols selected from the group consisting of 3,4-epoxy-cyclohexane-1,1-dimethanol and lower alkyl substituted 3,4-epoxycyclohexane-1,1-dimethanols in which the hydroxyl groups of said alcohols are esterified by non-conjugated epoxy acids characterized by the formula:

$$(C_nH_{2n+1-2x}O_x) \cdot COOH$$

wherein the group $(C_nH_{2n+1-2x}O_x)$ represents an epoxyalkyl group containing $n$ carbon atoms, $2n+1-2x$ hydrogen atoms and $x$ oxygen atoms and wherein $n$ represents the integer 17 and $x$ represents a whole positive integer in the range from 2 through 3.

Another novel feature and particularly important embodiment of this invention is directed to the partially epoxidized mixtures of the dihydroxy diesters of the above-mentioned alcohols and acids containing at least 2.4 weight percent oxirane oxygen and preferably from 2.4 to about 8.5 weight percent oxirane oxygen. It has been found that some residual unsaturation is sometimes effective in enhancing the overall utility of the compounds of this invention as plasticizers and stabilizers for vinyl halide resins and particularly vinyl chloride resins.

The analyses for determining epoxidant, that is, peracetic acid or acetaldehyde monoperacetate content, can be performed, for example, by introducing one to 1.5 grams of a sample of unknown epoxidant concentration into a flask containing a mixture of 60 milliters of 50 weight percent aqueous sulfuric acid solution and five milliliters of a saturated potassium iodide solution. The flask is swirled to mix the solutions and then titrated immediately with a 0.1 N aqueous sodium thiosulfate solution to a colorless endpoint. From the titration data thus obtained, a determination of epoxidant content can be made.

The analysis for the oxirane oxygen content of an epoxide sample is based upon its reaction with pyridine hydrochloride to form pyridine and the corresponding chlorhydrin of the epoxide. This analysis can be performed, for example, by introducing into a pressure bottle, containing 25 milliliters of 1 N pyridine hydrochloride in chloroform, an amount of epoxide sample calculated to react with about 50 percent of the pyridine hydrochloride. The bottle is then sealed and the contents heated in a steam bath for a period of about one hour. At the end of this time, the bottle and contents are cooled, ten drops of phenolphthalein indicator (1.0 gram per 100 milliliters of 60 percent ethanol) added, and the mixture titrated to a permanent red endpoint with a standard 0.2 N alcoholic potassium hydroxide solution. A blank is also run in precisely the same fashion without, however, the inclusion of a sample. From the titration data thus obtained, the amount of pyridine hydrochloride consumed by reaction with the epoxide sample can be calculated and from this the epoxy group content can be determined.

The following examples will serve to illustrate the practice of the invention.

EXAMPLE 1

*Preparation of linseed oil acid diesters of 3-cyclohexene-1,1-dimethanol*

A mixture of 71 grams of 3-cyclohexene-1,1-dimethanol, 311 grams of linseed oil fatty acids (a product of the Woburn Degreasing Co. designated "Linseedine Fatty Acids"), 300 ml. of toluene, and 0.4 grams tetrabutyl titanate was charged to a still kettle equipped with a fractionating column containing a still-head suitable for decanting the water layer of the distillate. The mixture was heated under reflux (kettle temperature 160° C.–201° C.) until water evolution had ceased (13 hours). The residue product was washed with hot water and stripped of volatiles and excess acid to a temperature of 210° C. at 8 mm. pressure. The residue product, the linseed fatty acid ester of 3-cyclohexene-1,1-dimethanol, was characterized by the following properties:

| | |
|---|---|
| Color | No. 12 Gardner. |
| Acidity | 0.219. |
| Saponification equi | 312.9. |
| Iodine No | 193.5. |
| Density 20/20 | 0.9475. |
| N 30/D | 1.4824. |

EXAMPLE 2

*Preparation of 3,4-epoxycyclohexane-1,1-dimethanol bis(9,10,12,13,15,16-triepoxystearate)*

A solution (298 grams) of 28 percent peracetic acid (1.1 mols) in ethyl acetate is added, with stirring, over a period of 45 minutes at a temperature of 50° C. to 95 grams (0.143 mol) of 3-cyclohexene-1,1-dimethanol dilinolenate. Stirring is continued for an additional 4 hours whereupon analyses for peracetic acid indicated that consumption of peracetic acid had substantially ceased. The reaction mixture is fed dropwise to the kettle of a still containing ethylbenzene under reflux at such a pressure as to maintain a kettle temperature of 50° C. Ethyl acetate, acetic acid, and ethylbenzene are removed continuously. After the addition is complete, the kettle material is stripped of volatiles by keeping it for 2 hours at a temperature of 70° C. under a pressure of 1 mm. while allowing a very slow stream of nitrogen to be admitted below the surface of the liquid. The residue product, predominantly 3,4-epoxycyclohexane-1,1-dimethanol bis(9,10,12,13,15,16-triepoxystearate) is characterized as a pale yellow viscous liquid having an oxirane oxygen content of 10.5 percent oxirane oxygen.

EXAMPLE 3

*Preparation of 3,4-epoxycyclohexane-1,1-dimethanol bis(9,10,12,13-diepoxystearate)*

A solution (363 grams) of 23 percent peracetic acid (1.1 mols) in ethyl acetate is added with stirring, over a period of 1 hour at a temperature of 50° C. to 133 grams (0.2 mol) of 3-cyclohexene-1,1-dimethanol dilinoleate. The reaction is continued at the same temperature for an additional 3.5 hours, whereupon an analysis for peracetic acid indicated that the reaction had proceeded substantially to completion. The reaction mixture is fed dropwise to the kettle of a still containing ethylbenzene under reflux at such a pressure as to maintain a kettle temperature of 50° C. Ethyl acetate, acetic acid, and ethylbenzene are removed continuously. After the addition is complete, the kettle material is stripped of volatiles by heating for 3 hours at 0° C. at 2 mm. pressure in a slow stream of nitrogen.

EXAMPLE 4

*Preparation of epoxidized linseed oil acid diesters of 3-cyclohexene-1,1-dimethanol*

A solution of 2.4 mols of peracetic acid in ethyl acetate is added dropwise to 275 grams of the linseed oil fatty acid ester of 3-cyclohexene-1,1-dimethanol over a period of 1 hour and 55 minutes while the temperature is maintained in the range of from 50 to 55° C. Stirring is continued for an additional 2 hours and 25 minutes whereupon an analysis for peracetic acid indicates that the reaction had proceeded substantially to completion. The reaction mixture is then stored at −11° C. for a period of 16 hours. The residue product is then purified by removing ethyl acetate, acetic acid and other volatiles and there is provided 311 grams of a light amber liquid having an oxirane oxygen content of 8.23 percent, an iodine value of 4.6 and a color of 6 Gardner.

What is claimed is:

1. 3,4-epoxycyclohexane-1,1-dimethanol bis(9,10,12,13,15,16-triepoxystearate).

2. 3,4-epoxycyclohexane-1,1-dimethanol bis(9,10,12,13-diepoxystearate).

3. Epoxidized linseed oil acid diester of 3-cyclohexene-1,1-dimethanol having from 2.4 to 8.5 weight percent oxirane oxygen.

4. Compounds of the formula:

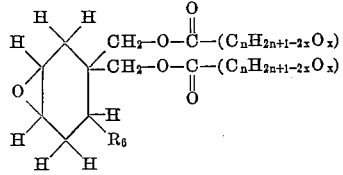

wherein $R_6$ represents a member selected from the group consisting of hydrogen atoms and methyl and the group $(C_nH_{2n+1-2x}O_x)$ represents an epoxyalkyl group containing $n$ carbon atoms, $2n+1-2x$ hydrogen atoms and $x$ oxygen atoms, said oxygen atoms being present only as oxirane oxygen attached to vicinal carbon atoms, $n$ represents the integer 17 and $x$ represents a whole positive integer in the range of from 2–3.

References Cited in the file of this patent

UNITED STATES PATENTS

| | | |
|---|---|---|
| 2,786,067 | Frostick et al. | Mar. 19, 1957 |
| 2,924,583 | Starcher et al. | Feb. 9, 1960 |

FOREIGN PATENTS

| | | |
|---|---|---|
| 653,351 | Great Britain | May 16, 1951 |